(12) United States Patent
McAfee

(10) Patent No.: US 12,442,329 B1
(45) Date of Patent: Oct. 14, 2025

(54) SENSOR SYSTEM FOR A CLOSED-CYCLE ENGINE

(71) Applicant: Hyliion Holdings Corp, Cedar Park, TX (US)

(72) Inventor: Gerry McAfee, Cincinnati, OH (US)

(73) Assignee: Hyliion Holdings Corp., Cedar Park, TX (US)

( * ) Notice: Subject to any disclaimer, the term of this patent is extended or adjusted under 35 U.S.C. 154(b) by 0 days.

(21) Appl. No.: 18/830,667

(22) Filed: Sep. 11, 2024

(51) Int. Cl.
*F02B 67/00* (2006.01)
*F02B 77/08* (2006.01)
*G01S 17/36* (2006.01)

(52) U.S. Cl.
CPC .............. *F02B 77/08* (2013.01); *G01S 17/36* (2013.01)

(58) Field of Classification Search
CPC ...... F02G 1/044; F02G 1/055; F02G 2244/52; F02G 2280/10; F02B 63/04; F02B 63/041; F02D 35/022
USPC ...................................................... 123/195 E
See application file for complete search history.

(56) References Cited

U.S. PATENT DOCUMENTS

| | | | |
|---|---|---|---|
| 10,724,470 B1* | 7/2020 | Mook | F02G 1/0435 |
| 10,770,996 B1* | 9/2020 | Waun | H02P 23/14 |
| 12,281,626 B1* | 4/2025 | Van De Voorde | F02F 3/02 |
| 2014/0324324 A1* | 10/2014 | Martin | F02P 23/04 |
| | | | 701/113 |
| 2018/0087483 A1* | 3/2018 | Miller | F02P 23/04 |
| 2019/0211765 A1* | 7/2019 | Dudar | F02P 23/04 |
| 2020/0370509 A1* | 11/2020 | Mook | F23R 3/005 |
| 2024/0159201 A1* | 5/2024 | Mook | F02G 1/04 |

* cited by examiner

Primary Examiner — Logan M Kraft
Assistant Examiner — James J Kim
(74) Attorney, Agent, or Firm — Dority & Manning, P.A.

(57) ABSTRACT

An engine may include an engine body. A piston assembly may be positioned at least partially within the engine body and including a first piston and a second piston. A connection member may be operably coupling the first piston to the second piston and causing the first piston and the second piston to move in conjunction with one another. A sled may be operably coupled with the connection member. A load member may be operably coupled with sled, the load member movable with the sled. A sensor system may be positioned through at least a portion of the engine body and operably coupled with the sled. The sensor system may include a transmitter configured to direct modulated emitted light into a sled chamber and a receiver configured to receive reflected light from the light source.

20 Claims, 7 Drawing Sheets

SENSOR SYSTEM FOR A CLOSED-CYCLE ENGINE

FIELD OF THE INVENTION

The present disclosure relates generally to vehicles having a closed-cycle engine, and more particularly to a sensor system for a closed-cycle engine.

BACKGROUND OF THE INVENTION

Large, wheeled vehicles pull trailers to transport large volumes of cargo. In some cases, the vehicle and trailer, in combination, may weigh upwards of 140,000 pounds for a tandem-loaded trailer. In a traditional vehicle with an internal combustion engine, the internal combustion engine may be quite large to provide enough power to propel the vehicle and the trailer.

Accordingly, large vehicles capable of integrating various power plants, such as a closed-cycle engine, that may allow for alternative power to be used to operate the large vehicle would be welcomed in the technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
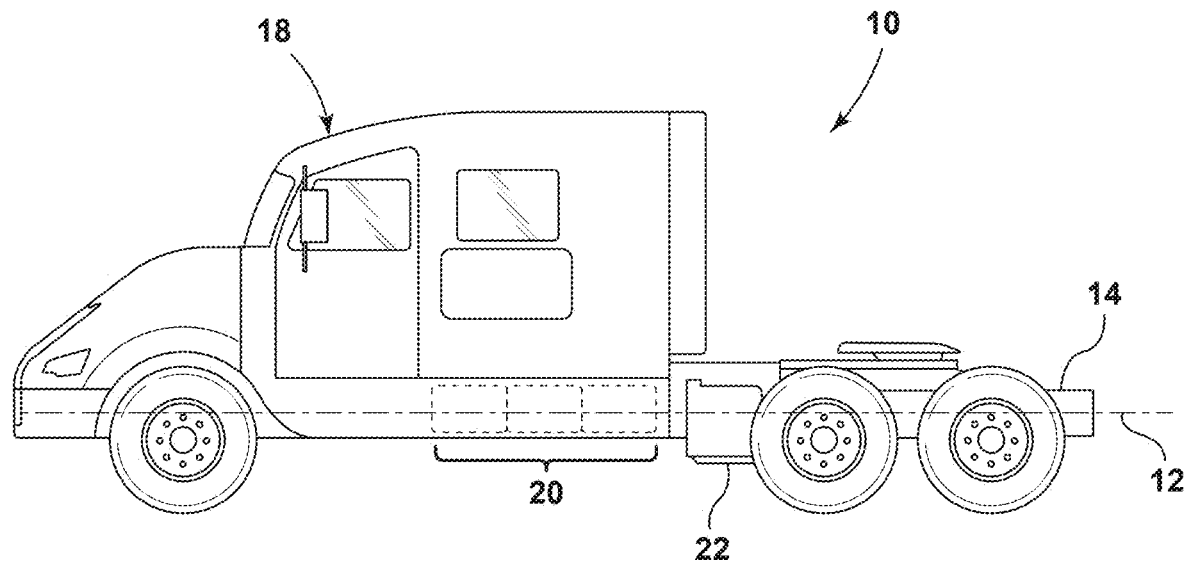
FIG. 1 illustrates a side view of a wheeled vehicle capable of transporting cargo over an extended range in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations may be made in the present disclosure without departing from the scope or spirit of the disclosure. For instance, features illustrated or described as part may be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a fluid within a fluid circuit. For example, "upstream" refers to the direction from which a fluid flows, and "downstream" refers to the direction to which the fluid moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected" or "operably coupled" to each other to achieve the desired functionality, and any two components capable of being so associated may also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items may be employed by itself, or any combination of two or more of the listed items may be employed. For example, if a composition or assembly is described as containing components A, B, and/or C, the composition or assembly may contain A alone; B alone; C alone; A and B in combination; A and C in combination; B and C in combination; or A, B, and C in combination.

In general, the present disclosure is directed to an engine that may include an engine body. A piston assembly may be positioned at least partially within the engine body and including a first piston and a second piston. A connection member may operably couple the first piston to the second piston and cause the first piston and the second piston to move in conjunction with one another. A sled may be operably coupled with the connection member. A load member may be operably coupled with sled. The load member may be movable with the sled.

A sensor system may be positioned through at least a portion of the engine body and operably coupled with the sled. The sensor system may be configured to determine one or more operating conditions of one or more components of the engine, such as a position of the sled, a velocity of the sled, an acceleration of the sled, etc. using any algorithm and/or data processing technique.

In some cases, the sensor system may determine the one or more operating conditions through a position sensor. The position sensor may include a transmitter including a light source and a transmitter light guide configured to direct modulated emitted light into a sled chamber defined by the engine body. The position sensor may further include a receiver including a receiver light guide and a photodetector configured to receive reflected light from the light source.

In several examples, the target may be constructed such that a reflective center region of a first reflectivity and a reflective outer-ring of a second reflectivity that is lowered that the first reflectivity are used to provide a step change in light intensity. As modulated emitted light moves across the surface of the target a step change in light intensity is observed and is proportional to the change. If the system becomes contaminated, the sensor can provide feedback and allow adjustment to compensate. This makes the sensor highly immune to contamination and has secondary functionally as a level-of-contamination measurement.

Figure 2:
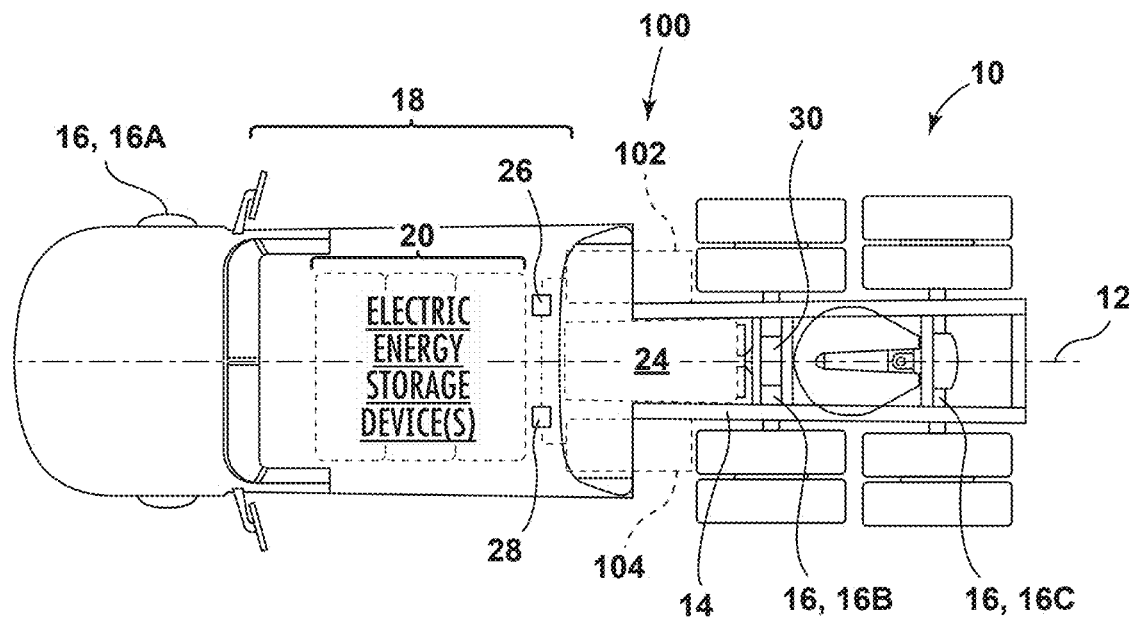
FIG. 2 illustrates a detailed, top view of a wheeled vehicle capable of transporting cargo over an extended range in accordance with aspects of the present subject matter.

Referring now to the drawings, FIGS. 1 and 2 illustrate various views of a wheeled vehicle 10 along a fore/aft axis 12 according to the present disclosure. As shown generally in FIGS. 1 and 2, the vehicle 10 may include a chassis 14, which may support multiple axles 16 and/or a cab 18. The one or more axles 16 may be operably coupled to the chassis 14. In some instances, the one or more axles 16 may include a front axle 16A and a pair of rear axles 16B, 16C.

Additionally, the vehicle 10 may include an engine assembly 100 that may include one or more closed-cycle engines 102, an array of energy storage devices 20 (e.g., batteries), and/or a motor/generator 22 coupled to at least one of the axles 16. Moreover, the vehicle 10 may include one or more fuel tanks 24 operably coupled with the one or more closed-cycle engines 102.

Furthermore, the vehicle 10 may be equipped with one or more power converters 26, 28 coupled to the closed-cycle engines 102 and the array of energy storage devices 20. In some cases, an array of energy storage devices 20 may be positioned in various locations on the vehicle 10. For instance, the energy storage devices 20 may be located between the rails of the chassis 14, under the rails of the chassis 14, around the rails of the chassis 14, and/or in any other practicable location. Moreover, the array of energy storage devices 20 may be connected in series, parallel, and/or some combination. In operation, electric power generated by the motor/generator 22 may be used to charge the array of energy storage devices 20.

With further reference to FIGS. 1 and 2, the motor/generator 22 may be coupled to at least one of the axles 16. For example, in some instances, the motor/generator 22 may be integrated with one of the axles 16 as an e-axle configuration or located in a hub of a wheel coupled to one of the axles 16 as a hub motor/generator configuration. Additionally or alternatively, the motor/generator 22 may be operably coupled to gearboxes or differentials of the vehicle 10. For example, the motor/generator 22 may be coupled to a three-speed centralized gearbox 30 with a two-speed rear differential 38 to provide six discrete gear ratios. In some examples, the vehicle 10 may be configured with a plurality of motors/generators 22, with a respective motor/generator 22 coupled to each wheel or pair of wheels.

While the closed-cycle engines 102 are used to power the vehicle 10 in FIGS. 1 and 2, it will be appreciated that the closed-cycle engines 102 may be used to generate mechanical energy for any other purpose without departing from the scope of the present disclosure.

Figure 3:
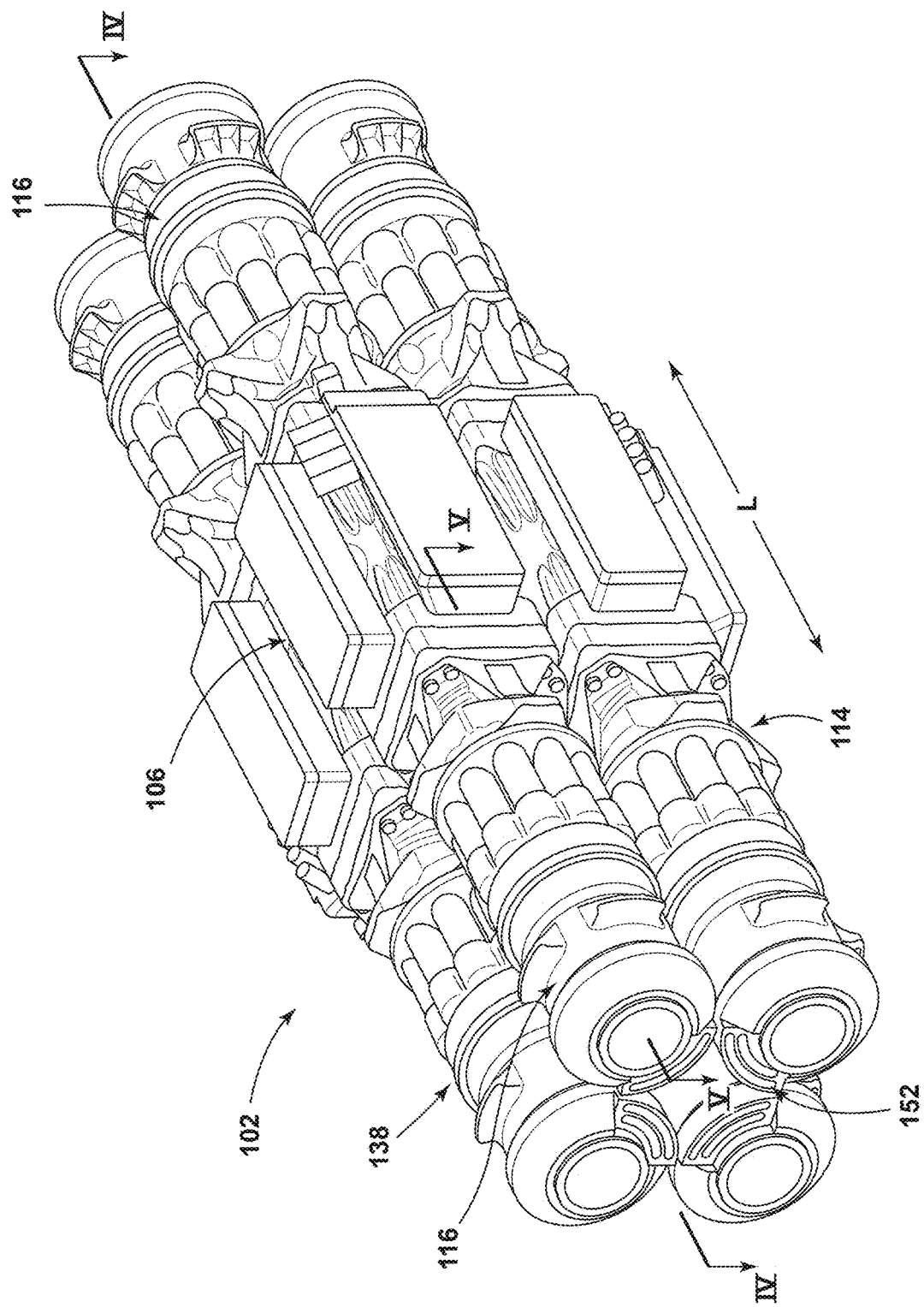
FIG. 3 illustrates a perspective view of a closed-cycle engine for a vehicle in accordance with aspects of the present subject matter.
Figure 4:
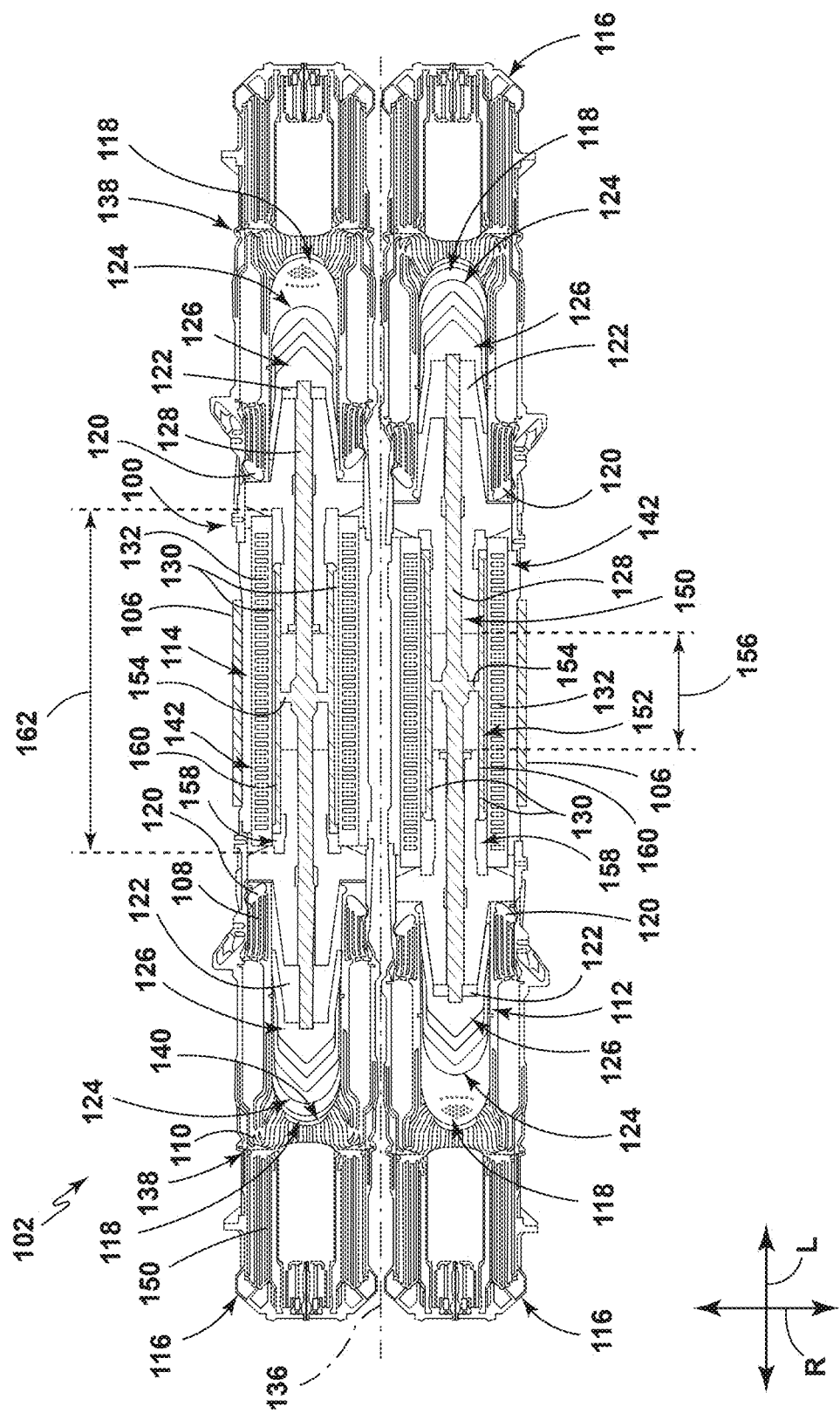
FIG. 4 illustrates a cross-sectional view of one of the closed-cycle engines taken along the line IV-IV of FIG. 3 in accordance with aspects of the present subject matter.
Figure 5:
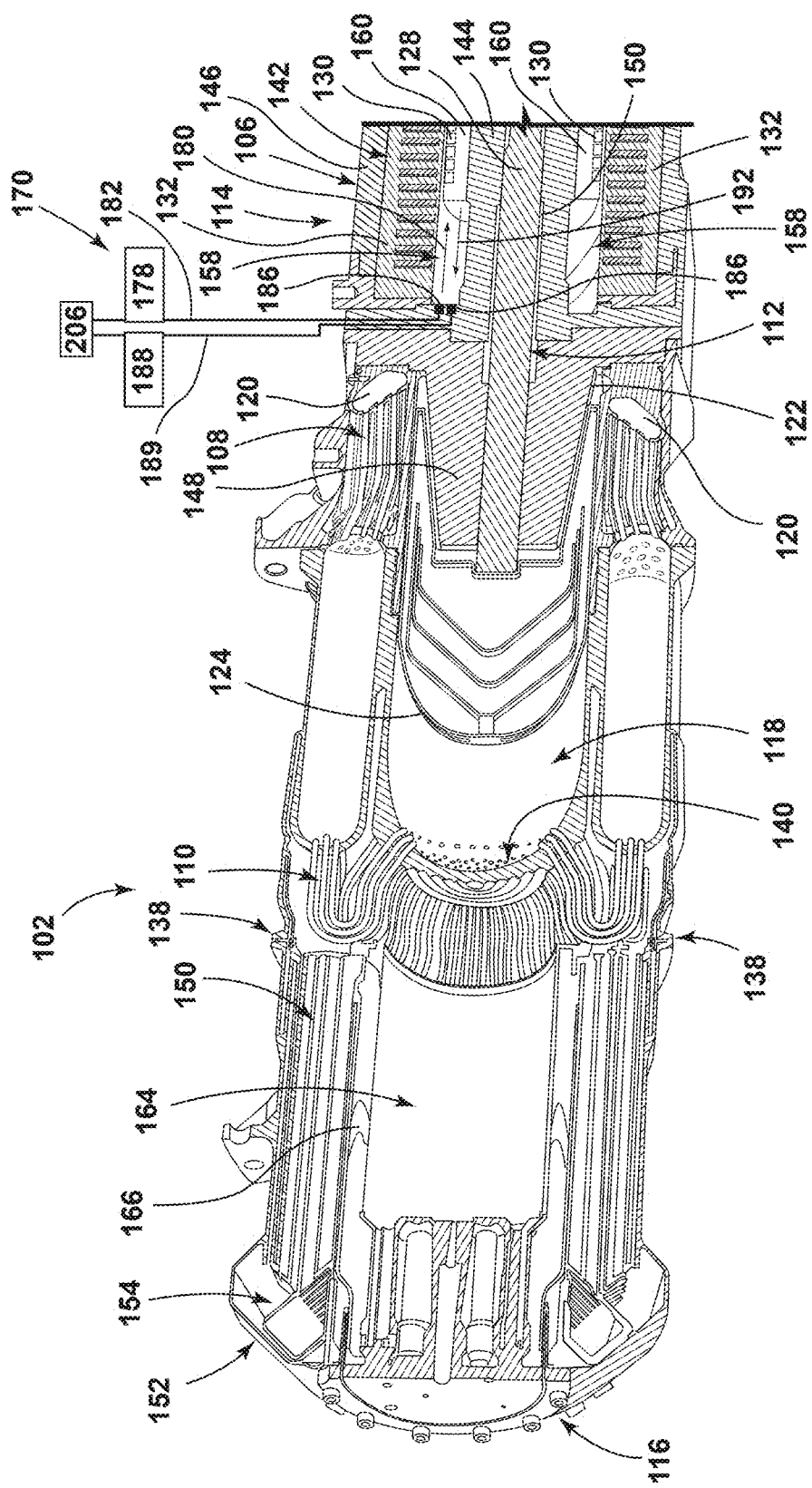
FIG. 5 illustrates a cross-sectional view of one of the closed-cycle engines taken along the line V-V of FIG. 3 in accordance with aspects of the present subject matter.

Referring now to FIGS. 3-5, the closed-cycle engines 102 capable of being operably coupled to a load device 106 are illustrated according to various aspects of the present disclosure. The closed-cycle engine 102 may contain an engine working fluid to which and from which thermal energy is exchanged at a respective cold side heat exchanger 108 and a hot side heat exchanger 110. In various instances, any suitable engine working fluid may be utilized in accordance with the present disclosure. In various cases, the working fluids may be inert, such that they generally do not participate in chemical reactions such as oxidation within the environment of the closed-cycle engine 102. For example, the engine working fluid may include a gas, such as a noble gas as the engine working fluid. Various noble gasses that may be utilized by the closed-cycle engine 102 may include monoatomic gases, such as helium, neon, argon, krypton, or xenon, as well as combinations of these. In several examples, the engine working fluid may include air, oxygen, nitrogen, hydrogen, carbon dioxide, any other practicable fluid, as well as combinations of these. In still various instances, the engine working fluid may be liquid fluids of one or more elements described herein, any other practicable element, and/or combinations thereof. It will be appreciated that various examples of the engine working fluid may include particles or other substances as appropriate for the engine working fluid.

In various cases, the load device 106 may be a mechanical work device and/or an electric machine. For example, the load device 106 may be a pump, compressor, or other work device. Additionally or alternatively, the load device 106 may be an electric machine that is configured as a generator configured to produce electric energy from the movement of a piston assembly 112 of the closed-cycle engine 102. In still another example, the electric machine may be configured as a motor that may provide motive force to move or actuate the piston assembly 112, such as to provide initial movement (e.g., a starter motor). In still various examples, the electric machine may be configured as a motor and generator or another electric machine.

As illustrated in FIGS. 3-5, the closed-cycle engine 102 may include an engine body 114 and a pair of housings 116 disposed on opposing sides of the engine body 114. For example, a first housing 116 may be disposed at a first side portion of the engine body 114 and a second housing 116 may be disposed at a second side portion of the engine body 114. In still other examples, a plurality of engine bodies 114 may be provided and a single housing 116 or a multitude of housings 116 may be operably coupled with the plurality of engine bodies 114.

In various embodiments, as shown in FIG. 4, the hot side heat exchanger 110 may output thermal energy to the engine working fluid at an expansion chamber 118 of the closed-cycle engine 102. The hot side heat exchanger 110 may be positioned proximate to the expansion chamber 118 of the engine in thermal communication with the housing 116. In other examples, the hot side heat exchanger 110 may be separate from the housing 116, such that the heating working fluid is provided in thermal communication, or additionally, in fluid communication with the hot side heat exchanger 110. In some cases, the hot side heat exchanger 110 may be positioned in thermal communication with the housing 116 and the expansion chamber 118 of the engine 102 such as to receive thermal energy from the housing 116 and provide thermal energy to the engine working fluid within the closed-cycle engine 102.

In still various examples, the housing 116 may include a single thermal energy output source to a single expansion chamber 118 of the engine. As such, the closed-cycle engine 102 may include a plurality of heater assemblies each providing thermal energy to the engine working fluid at each expansion chamber 118. In other embodiments, such as depicted in regard to FIG. 4, the housing 116 may provide thermal energy to a plurality of expansion chambers 118 of the closed-cycle engine 102.

The closed-cycle engine 102 may further include a chiller assembly 120. The chiller assembly 120 may be configured to receive and displace thermal energy from a compression chamber 122 of the closed-cycle engine 102. Additionally, the cold side heat exchanger 108 may be thermally coupled to the compression chamber 122 of the closed cycle engine 102, and the chiller assembly 120. In some instances, the cold side heat exchanger 108 and a piston chamber 126 defining the compression chamber 122 of the closed-cycle engine 102 may together be defined as an integral, unitary structure. In still various examples, the cold side heat exchanger 108, at least a portion of the piston chamber 126 defining the compression chamber 122, and at least a portion of the chiller assembly 120 may together define an integral, unitary structure.

In various embodiments, as shown in FIG. 4, the chiller assembly 120 may be a bottoming cycle to the closed-cycle engine 102. As such, the chiller assembly 120 may be configured to receive thermal energy from the closed-cycle engine 102. The thermal energy received at the chiller assembly 120, such as through a cold side heat exchanger 108, may be added to a chiller working fluid at the chiller assembly 120. In various examples, the chiller assembly 120 defines a Rankine cycle system through which the chiller working fluid flows in a closed loop arrangement with a compressor. In some examples, the chiller working fluid may be in a closed-cycle arrangement with an expander. In various cases, the cold side heat exchanger 108 may include a condenser or radiator. The cold side heat exchanger 108 may be positioned downstream of the compressor and upstream of the expander and in thermal communication with the compression chamber 122 of the closed-cycle engine 102. In various embodiments, the cold side heat exchanger 108 may generally define an evaporator receiving thermal energy from the closed-cycle engine 102.

Referring still to FIG. 4, each piston assembly 112 may be positioned within a volume or piston chamber 126. The volume within the piston chamber 126 is separated into a first chamber, or hot chamber, or expansion chamber 118 and a second chamber, or cold chamber (relative to the hot chamber), or compression chamber 122 by a piston 124 of the piston assembly 112. The expansion chamber 118 may be positioned thermally proximally to the housing 116 relative to the compression chamber 122 thermally distal to the housing 116. The compression chamber 122 may be positioned thermally proximal to the chiller assembly 120 relative to the expansion chamber 118 thermally distal to the chiller assembly 120.

In various instances, the piston assembly 112 may be configured as a double-ended piston assembly 112 in which a pair of pistons 124 are each coupled to a connection member 128. The connection member 128 may generally define a rigid shaft or rod extended along a direction of motion of the piston assembly 112. In other instances, the connection members 128 may include one or more springs or spring assemblies, such as further provided herein, providing flexible or non-rigid movement of the connection member 128. In still other instances, the connection member 128 may further define substantially U-shaped connections or V-shaped connections between the pair of pistons 124.

Each piston 124 may be positioned within the piston chamber 126 such as to define the expansion chamber 118 and the compression chamber 122 within the volume of the piston chamber 126. In operation, combustion may occur within a first combustion chamber 118 housing the first piston 124 causing the first piston 124, the connection member 128, and the second piston 124 to move from a first position to a second position in a lateral direction L. In turn, combustion may occur within a second combustion chamber 118 housing the second piston 124 causing the first piston 124, the connection member 128, and the second piston 124 to move from the second position to the first position. The load device 106 may be operably coupled to the piston assembly 112 such as to extract energy therefrom, provide energy thereto, or both. The load device 106 may define an electric machine that is in magnetic communication with the closed-cycle engine 102 via the connection member 128. In various examples, the piston assembly 112 may include a load member 130 positioned in operable communication with a stator assembly 132 of the electric machine. The stator assembly 132 may generally include a magnet array and a plurality of windings wrapped circumferentially relative to the piston assembly 112 and extended along a lateral direction L. In some instances, such as depicted in regard to FIG. 4, the load member 130 is connected to the connection member 128. In some examples, the linear motion of the load member 130 in conjunction with the piston assembly 112 may generate electricity via the magnetic communication between the stator assembly 132 and the load member 130.

Referring still to FIG. 4, in various embodiments, the hot side heat exchanger 110 may further define at least a portion of the expansion chamber 118. In some cases, the hot side heat exchanger 110 defines a unitary or monolithic structure with at least a portion of the piston chamber 126, such as to define at least a portion of the expansion chamber 118. In some embodiments, the housing 116 may further define at least a portion of the hot side heat exchanger 110, such as to define a unitary or monolithic structure with the hot side heat exchanger 110.

Furthermore, as shown in FIGS. 3-5, the piston chamber 126 may define a dome structure 140 within the expansion chamber 118. The expansion chamber dome structure 140 may provide reduced surface area heat losses across the outer end segment of the expansion chamber 118. In various instances, the pistons 124 of the piston assembly 112 may also include domed pistons 124 corresponding to the expansion chamber dome structure 140. The dome structure 140, the domed piston 124, or both may provide higher compression ratios at the chambers 122, such as to improve power density and output.

Various examples of the closed-cycle engine 102 may include control systems and methods of controlling various sub-systems disclosed herein, such as, but not limited to, the fuel source, the oxidizer source, the cooling fluid source, the housing 116, the chiller assembly 120, and the load device 106, including any flow rates, pressures, temperatures, loads, discharges, frequencies, amplitudes, or other suitable control properties associated with the closed-cycle engine 102.

In some examples, the control system may control the closed-cycle engine 102 to generate a temperature differential, such as a temperature differential at the engine working fluid relative to the heating working fluid and the chiller working fluid. Thus, the closed-cycle engine 102 defines a hot side, such as at the expansion chamber 118, and a cold side, such as at the compression chamber 122. The temperature differential causes free piston assemblies 112 to move within their respective piston chambers 126. The movement of pistons 124 within the respective piston chambers 126 causes the electric machine to generate electrical power. The generated electrical power may be provided to the energy storage devices 20 (FIG. 2). The control system may monitor one or more operating conditions associated with the closed-cycle engine 102, such as piston movement (e.g., amplitude and position), as well as one or more operating conditions associated with the electric machine, such as voltage or electric current. Based on such conditions, the control system generates control commands that are provided to one or more controllable devices of the closed-cycle engine 102. The controllable devices execute control actions in accordance with the control commands.

In various examples, such as the one shown in FIG. 4, the load device 106 may include a machine body 142 positioned laterally between the piston chambers 126. The machine body 142 surrounds and houses the stator assembly 132 of the load device 106 defining the electric machine. The machine body 142 may further surround the load member 130 of the electric machine attached to the connection member 128 of the piston assembly 112.

With further reference to FIGS. 4 and 5, in some cases, the engine body 114 may be formed from one or more sections. For instance, the engine body 114 may define a radially inward section 144, a radially outward section 146, and/or a pair of lengthwise sections 148. However, it will be appreciated that the engine body 114 may be formed from different sections, more sections, less sections, and/or as a monolithic component.

In some cases, the engine body 114 may define a connection member chamber 150. The connection member 128 may be allowed to move in the lateral direction L between the first position and the second position within the connection member chamber 150. The engine body 114 may further define a support chamber 152, which may be positioned radially R outward (and/or in any other position) relative to the connection member chamber 150. A support 154 may be positioned within the support chamber 152. In various examples, the support 154 may be integrally formed with the connection member 128 and/or attached thereto. The support chamber 152 may have a width 156 in the lateral direction L that is at least equal to a width of the support 154 in the lateral direction L plus a difference between a piston separation length and a combustion chamber length. As such, the support 154 may move laterally along the lateral direction L with the connection member 128.

The engine body 114 may further define a sled chamber 158, which may be positioned radially R outward (and/or in any other position) relative to the connection member chamber 150 and/or the support chamber 152. A sled 160 may be positioned within the sled chamber 158. In various examples, the sled 160 may be integrally formed with the support 154 and/or attached thereto. Additionally or alternatively, the sled 160 may be integrally formed with the connection member 128 and/or attached thereto. The sled chamber 158 may have a width 162 in the lateral direction L that is at least equal to a width of the sled 160 in the lateral direction L plus a difference between a piston separation length and a combustion chamber length. As such, the sled 160 may move laterally along the lateral direction L with the connection member 128.

Figure 6:
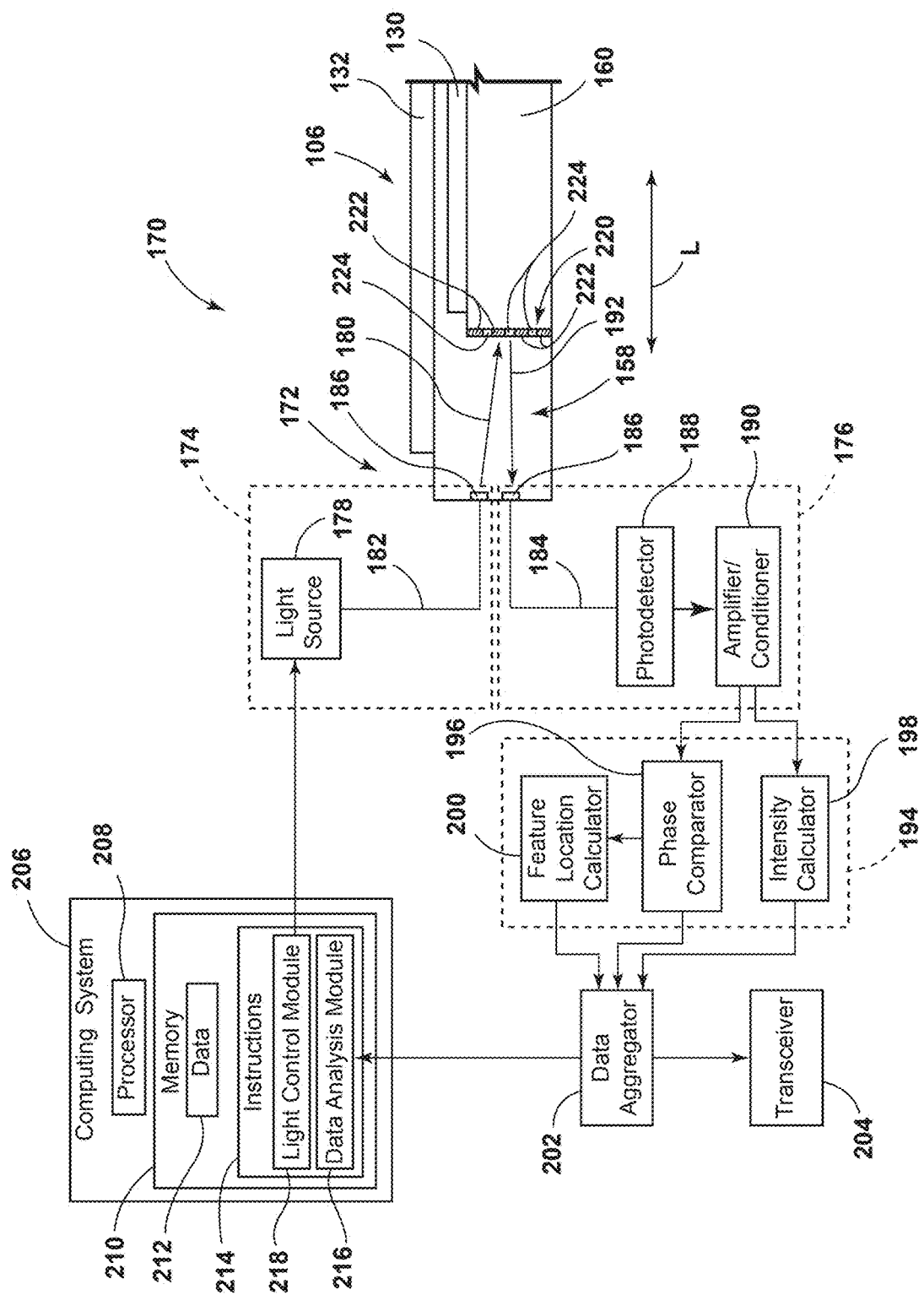
FIG. 6 illustrates a block diagram of a sensor system in accordance with aspects of the present subject matter.
Figure 7:
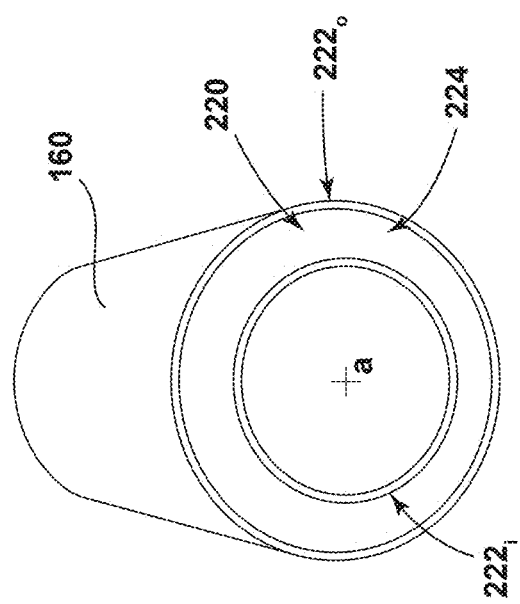
FIG. 7 illustrates a side perspective view of a sled in accordance with aspects of the present subject matter.

Referring now to FIGS. 5-7, in several examples, the closed-cycle engine 102 may include a sensor system 170 that is configured to detect to capture data related to the closed-cycle engine 102. For instance, the sensor system 170 may include a position sensor 172 that is configured to detect a position of the sled 160 within the sled chamber 158 and/or the position of any other component provided herein. The position sensor 172 may be configured as any practicable sensor, such as a Light Detection and Ranging (LIDAR) system, a capacitive displacement sensor, an eddy-current sensor, a Hall effect sensor, an inductive sensor, a laser Doppler vibrometer, a linear variable differential transformer (LVDT), a photodiode array, a piezo-electric transducer, a position encoders, a proximity sensor, a string potentiometer, an ultrasonic sensor, and/or any other sensor.

In some instances, the position sensor 172 may include a transmitter 174 and a receiver 176. The transmitter 174 may include a light source 178 that is configured to generate outgoing pulses of modulated emitted light 180. In various cases, the light source 178 may be configured as incoherent light emitting diodes (LEDs), coherent laser diodes, and/or any other practicable light source. In any manner, the transmitter 174 may generate visible light, infrared light, ultraviolet light, and/or any other detectable electromagnetic radiation.

As illustrated, the transmitter 174 may further include a transmitter light guide 182. In some instances, the transmitter light guide 182 is positioned through at least a portion of the engine body 114 and into a side portion of the sled chamber 158. In some cases, the transmitter light guide 182 may include an input section, an output section, and an elongated body extending between the input section and the output section. The elongated body may be configured to transfer the light emitted from the light source 178 to the output section of the transmitter light guide 182.

As illustrated, the receiver 176 may further includes a receiver light guide 184. In some instances, the receiver light guide 184 is positioned through at least a portion of the engine body 114 and into the side portion of the sled chamber 158. In some cases, the receiver light guide 184 may include an input section, an output section, and an elongated body extending between the input section and the output section. The elongated body may be configured to transfer the light received from the input section to the output section of the receiver light guide 184.

In several examples, the transmitter light guide 182 and/or the receiver light guide 184 may be configured to transmit light there along. For instance, each of the transmitter light guide 182 and the receiver light guide 184 may include a fiber optic that is configured to generally direct light along the light guide. However, the transmitter light guide 182 and/or the receiver light guide 184 may include any other structure without departing from the teachings provided herein. Moreover, in various examples, the input section of the transmitter light guide 182, the output section of the transmitter light guide 182, the input section of the receiver light guide 184, and/or the output section of the receiver light guide 184 may include optics 186 therein for directing light and/or receiving light in a defined manner.

The receiver 176 may include a photodetector 188 (e.g., photodiodes, avalanche photodiodes, PIN diodes or charge coupled devices CCDs, single photon avalanche detectors (SPADs), streak cameras) to sense and record the phase difference of modulated of light reflections from objects, such as the sled 160, thereby generating reflection signals. The receiver 176 may further include one or more signal amplifiers and conditioners 190 (e.g., operational amplifiers or transconductance amplifiers) to convert photocurrent into voltage signals.

In operation, the transmitter 174 may direct pulses of modulated emitted light 180 into the sled chamber 158 (and/or any other portion of the engine). The pulses of modulated emitted light 180 may be reflected off of the sled 160 causing reflected light 192 to be direct towards the receiver 176. In some examples, the position sensor 172 can further include circuitry 194, such as a circuit for a phase difference comparator and/or time of flight measurement (e.g., a phase comparator) and/or a circuit for an intensity calculator 198. The phase difference comparator 196 may be configured to compare the phase angle of the reflected light 192 (reflected wave) with the phase of the modulated emitted light and thereby estimate the target position. The phase difference comparator 196 can also function to calculate the phase difference associated with modulated emitted light 180 striking an object (e.g., the sled 160) and returning as reflected light 192 to the receiver 176. In some examples, the phase difference comparator 196 may compare a phase angle of the reflected light 192 with a phase of the modulated emitted light to estimate a time-of-flight.

In some examples, a light control module 218 (FIG. 6) may be configured to control a modulation of the modulated emitted light 180. Thus, under control of the light control module 218, the transmitter 174 may be configured to emit modulated light and measure the time the modulated light takes to travel from transmitter 174 to the sled 160 and back to the receiver 176. The elapsed time, referred to herein as a "time-of-flight," enables the sensor system 170 to generate data and output the data to a circuitry 194 (FIG. 6), a data aggregator 202 (FIG. 6), a transceiver 204 (FIG. 6), a computing system 206 (FIG. 6) and/or any other component. As such, the sensor system 170 may measure the time-of-flight by using or determining a phase difference between the reflected modulated light 180 and the modulated emitted light 180. For example, a phase difference can be translated to a distance based on the known frequency difference and a position acquisition time. Thus, a distance between the receiver 176 and the transmitter 174 can be determined. As the position of the transmitter 174 and the receiver 176 are known, a change in distance may be correlated to a position of the sled 160 can be determined upon receipt of the reflected modulated light 180.

The phase difference comparator 196 can also contain an analog-to-digital converter to convert an analog signal resulting from reflected photons and convert it to a digital signal. The intensity calculator 198 may be configured to calculate the intensity of reflected light 192. In some cases, the position sensor 172 can further include a feature location calculator 200 configured to calculate a location (e.g., a three dimension location) associated with the reflected light 192.

The position sensor 172 may further include a data aggregator 202 to gather digitized data from the phase difference comparator 196, the intensity calculator 198, and/or the feature location calculator 200. In some cases, the data aggregator 202 may be configured to group data into packets for a transceiver 204 and/or a computing system 206 (e.g., a sensor data processor).

In some cases, the computing system 206 may be configured as an electronic controller having electrical circuitry configured to process data from the data aggregator 202, the phase difference comparator 196, the intensity calculator 198, and/or the feature location calculator 200. In the illustrated example, the computing system 206 includes one or more processors 208 and memory 210. In general, the computing system 206 may correspond to any suitable processor-based device(s), such as a computing device or any combination of computing devices. For example, the computing system 206 may generally include one or more one or more processors 208 and associated memory 210 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 210 may generally include memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 210 may generally be configured to store information accessible to the one or more processors 208, including data 212 that can be retrieved, manipulated, created, and/or stored by the one or more processors 208 and instructions 214 that can be executed by the one or more processors 208.

In several embodiments, the instructions 214 stored within the memory 210 of the computing system 206 may be executed by the one or more processors 208 to implement a data analysis module 216. In general, the data analysis module 216 may be configured to analyze the input data (e.g., a set of input data received from the data aggregator 202, the phase difference comparator 196, the intensity calculator 198, the feature location calculator 200, and/or the photodetector 188 (or amplifier/conditioner 190) to determine one or more operating conditions of one or more components of the closed-cycle engine 102 (e.g., a position of the sled 160, a velocity of the sled 160, an acceleration of the sled 160, etc.) using any algorithm and/or data processing technique.

For example, the data analysis module 216 may use a database of previous objects and characteristic features stored in the memory 210 to classify parts of the data from the reflected pulses, which in turn may be used to determine the one or more operating conditions of one or more components of the closed-cycle engine 102. In various examples, the data analysis module 216 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system 206 and may be used to generate subsequent instructions 214.

Referring still to FIG. 6, the instructions 214 stored within the memory 210 of the computing system 206 may also be executed by the one or more processors 208 to implement a light control module 218. In general, the light control module 218 may define a set of modulation conditions and/or operating conditions for the light source 178. The operating conditions may define aspects of the modulated emitted light 180 such as the direction, pulse duration, intensity and/or a spot size.

In operation, the transmitter 174 may be configured to receive a control signal from the light control module 218, and output the modulated emitted light 180 according to the control signal. The receiver 176 may be configured to receive the reflected light 192 and demodulate the reflected light 192 (such as by using the modulation signal) such that a phase difference (i.e., phase shift) between the modulated emitted light 180 modulated reflected light 192 may be detected and measured. In some cases, the circuitry 194 may be configured to calculate the position of the sled 160 based on the plurality of control signals using phase difference information embedded in each control signal. In particular, the circuitry 194 may calculate an absolute phase difference based on the phase difference values associated with the control signals and translate the absolute phase difference into distance information. As provided herein, a distance between the receiver 176 and the transmitter 174 can be determined based on the distance information. As the position of the transmitter 174 and the receiver 176 are known, a change in distance may be correlated to a position of the sled 160 can be determined upon receipt of the reflected modulated light 180. Thus, a position of the sled 160 can be generated, output, and/or displayed.

With further reference to FIGS. 5-7, in some examples, a target 220 may be attached to or integrally formed with the sled 160. As shown, the target 220 may include one or more first segments 222 and one or more second segments 224. The one or more first segments 222 may be reflective. As used herein, "reflective" means any surface capable of reflecting light in either a specular (mirror-like) manner and/or a diffusive (retaining the energy, but losing the image) manner. In some instances, the one or more first segments 222 may be specularly reflective. The one or more second segments 224 may be absorbative. As used herein, "absorbative" means any material that takes a photon's energy—and so transforms electromagnetic energy into internal energy of the absorber (for example, thermal energy). In some cases, the one or more second segments 224 may attenuate radiation, which is the gradual reduction of the intensity of light waves as they propagate through the one or more second segments.

As illustrated in FIGS. 6 and 7, the one or more first segments 222 may include a first inside segment 222; and/or an outside first segment 2220, which may be oriented relative to a lengthwise axis of the sled 160 (and/or disposed on and in relation to any other component). In some instances, the positioning of the first inside segment 222 and/or the outside first segment 2220 may be used to calibrate the data received from the sensor system 170. In general, the sensor system 170 may be configured to detect a transition from a relatively higher reflective area of the one or more first segments 222 relative to the relatively lower reflective area of the one or more second segments 224. Additionally or alternatively, based on the difference in reflectivity between the one or more first segments 222 and the one or more second segments 224, the computing system 206 may be configured to determine a contamination level of the target 220, and, consequently, the sled 160. Moreover, in some cases, the contamination level may be used to filter at least a portion of the data in order to enhance the accuracy of the sensor system 170.

Figure 8:
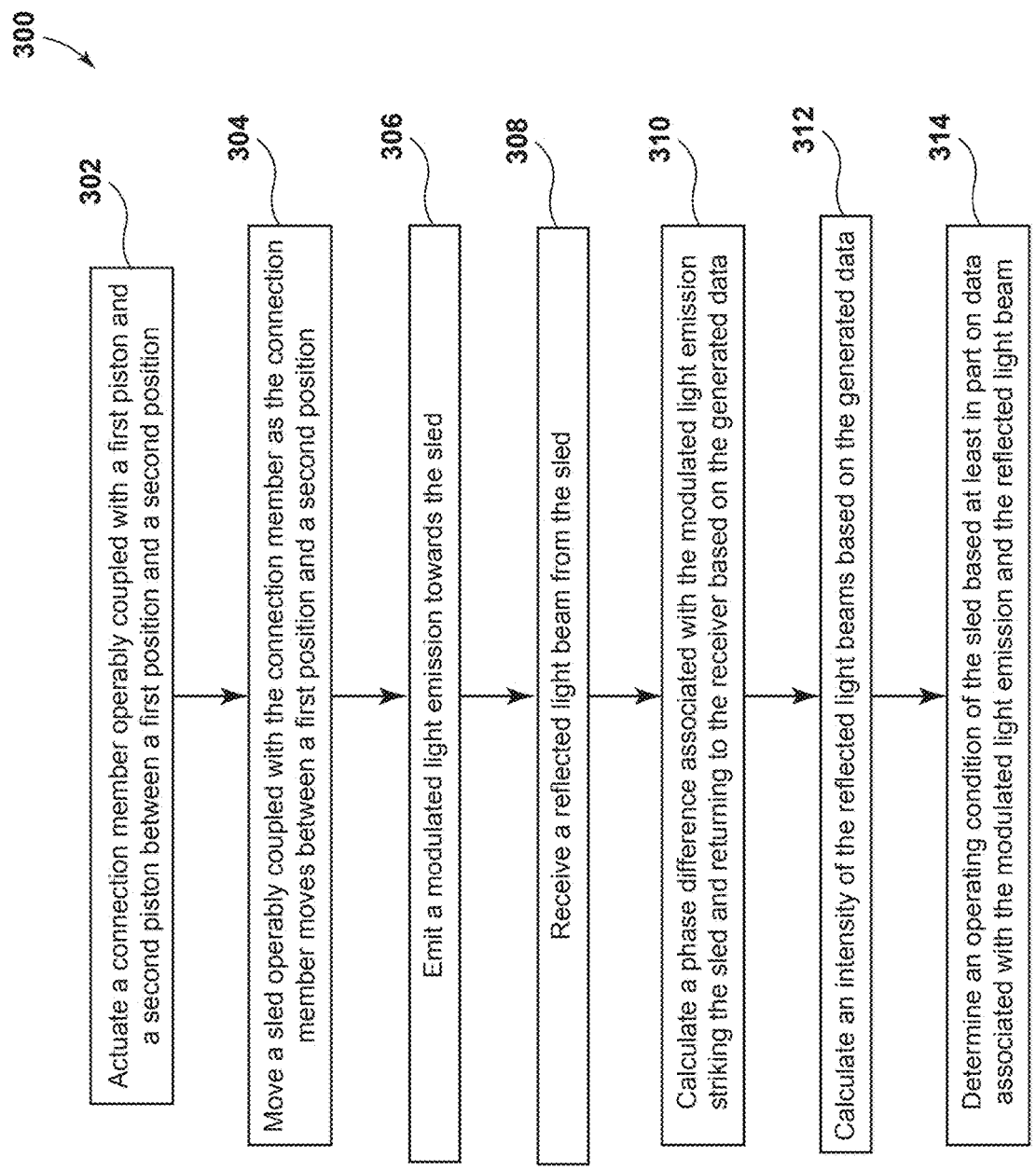
FIG. 8 is a flow diagram of a method for operating a closed-cycle engine in accordance with aspects of the present subject matter.

Referring now to FIG. 8, a flow diagram of an embodiment of a method 300 for operating an engine is illustrated. In general, the method 300 will be described herein with reference to the closed-cycle engine 102 illustrated in FIGS. 1-7. However, it should be appreciated that the disclosed method 300 may be implemented with any engine having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein may be omitted, rearranged, combined, and/or adapted in numerous ways without deviating from the scope of the present disclosure.

As illustrated, at (302), the method 300 may include actuating a connection member operably coupled with a first piston and a second piston between a first position and a second position. The connection member may generally define a rigid shaft or rod extended along a direction of motion of the piston assembly. In other instances, the connection members may include one or more springs or spring assemblies, such as further provided herein, providing flexible or non-rigid movement of the connection member. In still other instances, the connection member may further define substantially U-shaped connections or V-shaped connections between the pair of pistons.

In operation, combustion may occur within a first combustion chamber housing the first piston causing the first piston, the connection member, and the second position to move from the first position to the second position. In turn, combustion may occur within a second combustion chamber housing the second piston causing the first piston, the connection member, and the second piston to move from the second position to the first position.

At (304), the method may include moving a sled operably coupled with the connection member as the connection member moves between the first position and the second position. As provided herein, the sled may be positioned within the sled chamber. In various examples, the sled may be integrally formed with the support and/or attached thereto. Additionally or alternatively, the sled may be integrally formed with the connection member and/or attached thereto.

At (306), the method 300 may include emitting a light pulse towards the sled. At (308), the method may include receiving a reflected light from the sled.

In various examples, at (310), the method may include calculating a phase difference associated with modulated emitted light striking the sled and returning to the receiver as reflected light based on the generated data with a phase difference comparator. Additionally or alternatively, at (310), the method may include calculating an intensity of the reflected light based on the generated data with an intensity calculator.

At (314), the method may include determining an operating condition of the sled based at least in part on data associated with the modulated emitted light and the reflected light with a computing system. In various examples, the operating condition may include a position of the sled, a velocity of the sled, or an acceleration of the sled.

Further aspects are provided by the subject matter of the following clauses:

An engine comprising: an engine body; a piston assembly positioned at least partially within the engine body and including a first piston and a second piston; a connection member operably coupling the first piston to the second piston and causing the first piston and the second piston to move in conjunction with one another; a sled operably coupled with the connection member; a load member operably coupled with sled, the load member movable with the sled; and a sensor system positioned through at least a portion of the engine body and operably coupled with the sled, the sensor system comprising: a transmitter including a light source and a transmitter light guide configured to direct a modulated emitted light into a sled chamber defined by the engine body; and a receiver including a receiver light guide and a photodetector configured to receive reflected light from the light source.

The engine of one or more of these clauses, wherein the sensor system further comprises: one or more signal amplifiers and conditioners to convert a photocurrent into a voltage signal.

The engine of one or more of these clauses, wherein the sensor system further comprises: a phase difference comparator configured to calculate a phase difference associated with the modulated emitted light striking the sled and returning to the receiver as reflected light.

The engine of one or more of these clauses, wherein the phase difference comparator compares a phase angle of the reflected light with a phase of the modulated emitted light to estimate a position of a target.

The engine of one or more of these clauses, wherein the sensor system further comprises: an intensity calculator configured to calculate an intensity of the reflected light.

The engine of one or more of these clauses, wherein the sensor system further comprises: a feature location calculator configured to calculate a location associated with the reflected light.

The engine of one or more of these clauses, wherein the sensor system further comprises: a computing system operably coupled with a phase difference comparator, an intensity calculator, or a feature location calculator.

The engine of one or more of these clauses, wherein the computing system is configured to determine one or more operating conditions of the sled based on data provided from the phase difference comparator, the intensity calculator, or the feature location calculator.

The engine of one or more of these clauses, wherein the computing system further comprises: a light control module configured to control activation of the light source.

The engine of one or more of these clauses, further comprising: a target operably coupled with the sled.

The engine of one or more of these clauses, wherein the target includes at least a first reflective segment and at least a second absorbative segment.

A method for operating an engine, the method comprising: actuating a connection member operably coupled with a first piston and a second piston between a first position and a second position; moving a sled operably coupled with the connection member as the connection member moves between the first position and the second position; emitting a modulated emitted light towards the sled; receiving a reflected light from the sled through a receiver; and determining, with a computing system, an operating condition of the sled based at least in part on data associated with the modulated emitted light and the reflected light.

The method of one or more of these clauses, further comprising: calculating, with a phase difference comparator, a phase difference associated with modulated emitted light striking the sled and returning to the receiver as reflected light based on the data.

The method of one or more of these clauses, further comprising: calculating, with an intensity calculator, an intensity of the reflected light based on the data.

The method of one or more of these clauses, wherein the operating condition includes a position of the sled, a velocity of the sled, or an acceleration of the sled.

A sensor system positioned through at least a portion of an engine body and operably coupled with a component within the engine body, the sensor system comprising: a transmitter including a light source and a transmitter light guide configured to direct modulated emitted light into a sled chamber defined by the engine body; a receiver including a receiver light guide and a photodetector configured to receive reflected light from the light source; and a phase difference comparator configured to calculate a phase difference associated with a modulated light striking the component and returning to the receiver, wherein the phase difference comparator compares a phase angle of the reflected light with a phase of the modulated emitted light to estimate a time-of-flight.

The sensor system of one or more of these clauses, wherein the sensor system further comprises: one or more signal amplifiers and conditioners to convert a photocurrent into a voltage signal.

The sensor system of one or more of these clauses, wherein the sensor system further comprises: an intensity calculator configured to calculate an intensity of reflected light.

The sensor system of one or more of these clauses, wherein the sensor system further comprises: a computing system operably coupled with the phase difference comparator, an intensity calculator, or a feature location calculator.

The sensor system of one or more of these clauses, wherein the computing system is configured to determine one or more operating conditions of a sled based on data provided from the phase difference comparator, the intensity calculator, or the feature location calculator.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An engine comprising:
   an engine body;
   a piston assembly positioned at least partially within the engine body and including a first piston and a second piston;
   a connection member operably coupling the first piston to the second piston and causing the first piston and the second piston to move in conjunction with one another;
   a sled operably coupled with the connection member;
   a load member operably coupled with sled, the load member movable with the sled; and
   a sensor system positioned through at least a portion of the engine body and operably coupled with the sled, the sensor system comprising:
      a transmitter including a light source and a transmitter light guide configured to direct a modulated emitted light into a sled chamber defined by the engine body; and
      a receiver including a receiver light guide and a photodetector configured to receive reflected light from the light source.

2. The engine of claim 1, wherein the sensor system further comprises:
   one or more signal amplifiers and conditioners to convert a photocurrent into a voltage signal.

3. The engine of claim 1, wherein the sensor system further comprises:
   a phase difference comparator configured to calculate a phase difference associated with the modulated emitted light striking the sled and returning to the receiver as reflected light.

4. The engine of claim 3, wherein the phase difference comparator compares a phase angle of the reflected light with a phase of the modulated emitted light to estimate a position of a target.

5. The engine of claim 1, wherein the sensor system further comprises:
   an intensity calculator configured to calculate an intensity of the reflected light.

6. The engine of claim 1, wherein the sensor system further comprises:
   a feature location calculator configured to calculate a location associated with the reflected light.

7. The engine of claim 1, wherein the sensor system further comprises:
   a computing system operably coupled with a phase difference comparator, an intensity calculator, or a feature location calculator.

8. The engine of claim 7, wherein the computing system is configured to determine one or more operating conditions of the sled based on data provided from the phase difference comparator, the intensity calculator, or the feature location calculator.

9. The engine of claim 7, wherein the computing system further comprises:
   a light control module configured to control activation of the light source.

10. The engine of claim 1, further comprising:
    a target operably coupled with the sled.

11. The engine of claim 10, wherein the target includes at least a first reflective segment and at least a second absorbative segment.

12. A method for operating an engine, the method comprising:
    actuating a connection member operably coupled with a first piston and a second piston between a first position and a second position;
    moving a sled operably coupled with the connection member as the connection member moves between the first position and the second position;
    emitting a modulated emitted light towards the sled;
    receiving a reflected light from the sled through a receiver; and
    determining, with a computing system, an operating condition of the sled based at least in part on data associated with the modulated emitted light and the reflected light.

13. The method of claim 12, further comprising:
    calculating, with a phase difference comparator, a phase difference associated with modulated emitted light striking the sled and returning to the receiver as reflected light based on the data.

14. The method of claim 13, further comprising:
    calculating, with an intensity calculator, an intensity of the reflected light based on the data.

15. The method of claim 13, wherein the operating condition includes a position of the sled, a velocity of the sled, or an acceleration of the sled.

16. A sensor system positioned through at least a portion of an engine body and operably coupled with a component within the engine body, the sensor system comprising:
    a transmitter including a light source and a transmitter light guide configured to direct modulated emitted light into a sled chamber defined by the engine body;
    a receiver including a receiver light guide and a photodetector configured to receive reflected light from the light source; and
    a phase difference comparator configured to calculate a phase difference associated with a modulated light striking the component and returning to the receiver, wherein the phase difference comparator compares a phase angle of the reflected light with a phase of the modulated emitted light to estimate a time-of-flight.

17. The sensor system of claim 16, wherein the sensor system further comprises:
    one or more signal amplifiers and conditioners to convert a photocurrent into a voltage signal.

18. The sensor system of claim 17, wherein the sensor system further comprises:
    an intensity calculator configured to calculate an intensity of reflected light.

19. The sensor system of claim 16, wherein the sensor system further comprises:
    a computing system operably coupled with the phase difference comparator, an intensity calculator, or a feature location calculator.

20. The sensor system of claim 19, wherein the computing system is configured to determine one or more operating conditions of a sled based on data provided from the phase difference comparator, the intensity calculator, or the feature location calculator.

* * * * *